(No Model.)
A. M. MICHEL.
SECONDARY BATTERY ELECTRODE.
No. 489,315.            Patented Jan. 3, 1893.
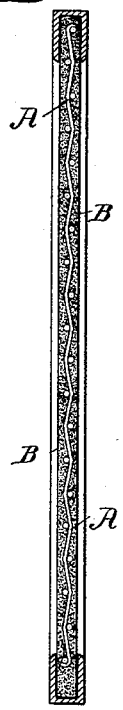
Fig. I.
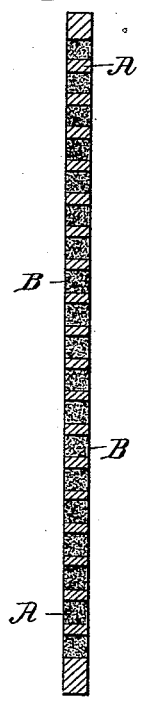
Fig. II.
Attest:
Geo. T. Smallwood.
Rufus Lewis.
Inventor;
Auguste M. Michel
by his attorneys
THE NORRIS PETERS CO., PHOTO-LITHO., WASHINGTON, D. C.

UNITED STATES PATENT OFFICE.

AUGUSTE MARIE MICHEL, OF PARIS, FRANCE.

SECONDARY-BATTERY ELECTRODE.

SPECIFICATION forming part of Letters Patent No. 489,315, dated January 3, 1893.

Application filed August 24, 1892. Serial No. 444,012. (No model.)

*To all whom it may concern:*

Be it known that I, AUGUSTE MARIE MICHEL, of Paris, in the Department of the Seine, in the Republic of France, have invented a new and useful Improvement in Secondary-Battery Elements, which is fully set forth in the following specification.

In theory the best known accumulator is that attributed to Reynier, and designated because of its composition, as the "lead-zinc" accumulator. The practical difficulty which attends its use is the loss of charge by the spontaneous dissolution of the zinc (deposited upon the negative electrode) while the circuit is open. Attempt has been made in various ways to diminish or remove this objection, as by reducing the dimensions of the surface of the negative element, or by amalgamating the surface of a lead plate, or by using porous vessels, or by the employment of special exciting solutions. In some of these accumulators, when charged, the electrolyzed zinc, finding upon the negative plate an insufficient quantity of mercury, amalgamated itself imperfectly, and therefore dissolved spontaneously after charge, even while the circuit was open. I have observed that, to prevent the zinc from being attacked by the acidulated liquor, the quantity of mercury present would be quite considerable, *i. e.*, in about equal proportions in weight of zinc and mercury. This proportion, however, is not absolute, as will be shown hereinafter. It is therefore desirable when a lead-zinc accumulator is being charged, that the zinc deposited upon the negative plate shall, as electrolysis proceeds, find a sufficient quantity of mercury in order that it may thereby become inattackable by, or be protected against, the action of the acidulated water while the circuit is open. During the discharge, however, the zinc becoming dissolved forms a soluble sulphate of zinc, the effect of which is a decrease of the zinc in the negative electrode, and the mercury which was allied to or amalgamated into that metal is set free. The mercury should not fall to the bottom of the vessel or receiver, because its effect would be lost when the accumulator is charged again to become amalgamated with the zinc, which proceeds from the decomposition of the sulphate.

The problem therefore was—(First) That during the charge of the accumulators electrolyzed zinc shall as fast as it becomes deposited be in contact with an abundant quantity of mercury, in order to form with it a strong amalgam. (Second) That the mercury necessary for this powerful amalgamation shall not be liable to drop off the negative plate when the discharge takes place. It is therefore necessary and important that the mercury should, as it were, be immobilized or held in place in or upon each negative plate, and should be distributed or spread over the whole surface as evenly as possible.

My invention, the object of which is to give effect to these essential or desirable conditions, therefore consists in the means, substantially as hereinafter described, of depositing the zinc while the battery is being charged, upon a layer of amalgam (zinc or other metal) sufficiently rich in mercury to yield all the mercury that may be necessary to combine with the electrolyzed zinc.

The means referred to are accumulator plates which I produce in the manner substantially as follows:

(First.) It is well known that a combination of a metal and mercury may be effected at high temperature, and that when the proportion of mercury is not too high the alloy may be molded into any form and solidifies by cooling. Plates may therefore be formed by this means, but they are quite brittle. To obviate this defect and to make plates, tubes or rods of relatively small thickness, yet of sufficient solidity, I consolidate the alloy by mechanical means, such as cores, skeleton frames, open work supports &c., which may be buried in or applied outside the mass before, during or after the molding of the plate. These alloys, rich in mercury, may be made in varying proportions. I have found for instance that the zinc amalgam containing one part of zinc, to from three to four parts of mercury, is sufficiently solid to be thus employed.

(Second.) We may proceed as follows: Take sufficient mercury for the quantity of zinc used to make an amalgam of pasty consistency, but not more than is necessary to have it solid at the ordinary temperature. This alloy when slightly compressed, becomes again for the time being pasty. We have thus an amalgam which we can spread over and squeeze into the meshes of a support made of metallic wire netting, or gauze, or a skeleton or open work frame of any suitable or convenient form. Rigid and solid plates may thus be produced that have a very great electric capacity, which may be determined by the weight of zinc which may be usefully deposited.

(Third.) The last method may be reversed; i. e., upon the amalgam rich in mercury, zinc resulting from the decomposition of the sulphate of zinc may be deposited until its weight shall at the end of the charge, equal that of the mercury in the plate, or from the plate containing equal proportions of mercury and zinc, enough zinc may be eliminated by discharge of the accumulator, to correspond with the quantity of electrical work which the plate ought to perform.

Finally, if in the methods described under heads first and second to form what I call the initial amalgam (which so to speak, is only a reservoir of mercury) a metal be used which is electro negative with respect to that in solution, identical results may be obtained. Thus, in the present case (lead and zinc accumulator) the initial amalgam may be formed with tin, lead, copper, silver &c.

In the accompanying drawings which form part of this specification, Figure I represents an electrode composed of a wire-gauze support A and a layer or body of amalgam B, and Fig. II represents a perforated plate A having the perforations filled with the amalgam B. These are both common forms of secondary battery elements, and are exhibited merely for purposes of illustration.

Application of plates thus produced may be made in any system of accumulators in whole or in part to elements which require powerful amalgamation, the metal serving as the base being charged according to circumstances. The plates may be of any suitable form and may be arranged vertically or horizontally according to circumstances. The plates are generally used as negatives, the positive plates and the liquid being constituted according to circumstances. Thus in the lead-zinc accumulator the positive plates are the ordinary lead plates made in any ordinary or suitable way.

What I claim is:—

1. In a lead-zinc accumulator, a negative element consisting of the combination with a frame, core or other suitable support, of an amalgam rich in mercury, (that is to say in which the quantity of mercury equals or exceeds that of the other metal) securely held therein, substantially as set forth.

2. The manufacture of electrodes for lead-zinc accumulators by spreading over or stuffing into the interstices or spaces between the frames, divisions, wire gauzes, rods or supports of any suitable form, amalgams rich in mercury, that is to say, composed of about equal proportion of the metals, as herein set forth.

In testimony whereof I have signed this specification in the presence of two subscribing witnesses.

AUGUSTE MARIE MICHEL.

Witnesses:
A. POLLOK,
GEORGE R. OSTHEIMER.